Patented Dec. 11, 1945

2,390,687

UNITED STATES PATENT OFFICE 2,390,687

PREPARATION OF COMPOUNDS OF TUNGSTEN AND SIMILAR METALS FROM THEIR ORES AND RESIDUES

Gideon Boericke, Wynnewood, and Edward E. Boericke, Lansdowne, Pa.; said Edward E. Boericke assignor to said Gideon Boericke No Drawing. Application February 10, 1945, Serial No. 577,344

5 Claims. (Cl. 23—18)

This invention relates to improvements in methods for preparing commercially pure compounds of the metal from the ores and residues of tungsten, or those of similar metals such as vanadium, uranium, and molybdenum, by converting the metals into soluble alkaline salts of the acids of those metals.

One of the objects of the invention is to lower the cost of production by making it possible to re-use mother liquors from such conversions, which will contain a large excess of hydrates of the alkaline metals after each cycle of the operation, to the end that such mother liquors need not be discarded nor neutralized and their value thereby lost.

Another object is to avoid the formation of slimy or gummy precipitates or gangues which, by present methods, often materially decrease the speed of filtration and washing out of the soluble values in solution.

Other objects of the invention and the improvements thereby effected will become evident from the following description.

A well-known method for extracting the specified metal values from ores and residues involves the digestion thereof at elevated temperatures and pressures, as in an autoclave, with solutions containing sodium hydrate or other caustic alkalies, or carbonates thereof. Usually, after sufficient digestion at elevated temperatures and pressures, the charge is filtered and washed; and dissolved impurities are then precipitated at lower temperatures, by precipitation as with lime, giving insoluble compounds of silicic, phosphoric, and stannic acids. The solution is then filtered off and the residue washed. The values are thereupon precipitated at higher temperatures as insoluble salts of calcium with the tungstic or similar acid compounds formed by the digestion; or their soluble sodium salts are crystallized out after sufficient concentration and cooling of the solution. The conversion of the impurities into insoluble calcium compounds has also been effected by the addition of suitable percentages of lime to the charge digested in the autoclave.

These procedures, however, often result in the formation of a gummy or gelatinous insoluble residue which is very difficult to filter; and the addition of lime to the reacting solution often is accompanied by a considerable increase of volume which lowers the capacity of the apparatus and thereby further impedes the economical operation of the treatment.

Moreover, the solution filtered from the insolubles often contains dissolved organic impurities which discolor the soluble or insoluble salt of the metal desired; and the accumulation of the coloring matter in solution prevents re-use of the mother liquors for succeeding charges, thereby further materially increasing the cost of the treatment.

Furthermore, it is necessary to use in the digestion a very large excess of hydrate or carbonate of an alkali metal over and above that required by stochiometric relationships, the excess amounting to many times that which would be required for conversion of the insoluble and acid compounds of the metals into soluble alkaline salts. Most of this large excess of soluble, costly alkaline compounds has heretofore been discarded or neutralized, which, of course, greatly increases the cost of the treatment. Accordingly, it is one of the purposes of this improvement so to purify the alkaline mother liquors remaining after the separation of the desired metal salts that they actually can be re-used for subsequent digestion of ores or residues, as in an autoclave. Prior suggestions for such re-use have not in fact been feasible.

Accordingly, this is an improvement upon priorly described methods of preparing compounds of the specified metals, such as those described in the foreign patents granted about forty years ago to G. A. Hempel, and in the U. S. Patents Nos. 1,293,402, 1,293,403, and 1,293,404 of February 4, 1919, issued to Giles and Giles. The processes described in those and other patents for similar processes have the defects in the speed or cost of operation heretofore mentioned.

To avoid these defects of formerly known processes for preparing compounds of tungsten and similar metals, we proceed as follows: We charge into an autoclave or vat of suitable capacity the ore or residue, together with a strong solution of caustic soda in water—for the first cycle of the operation—and with caustic mother liquor, in later cycles; we add thereto a suitable proportion of the mineral bauxite of high alumina and low $SiO_2$ content, say 65–75% $Al_2O_3$ and 15–20% $SiO_2$. The proportions of these constituents of the mixture are, of course, determined by the composition of the ore or residue; but the following is an example of a batch for the first cycle of treatment of an ore or residue containing 14.8% of tungstic oxide:

Ore or residue _____ lbs__ 4,914 (14.8% $WO_3$)
$H_2O$ _____ gals__ 500
NaOH _____ lbs__ 2,180
Bauxite _____ lbs__ 346

The charge was heated and digested in the autoclave, by steam at pressures giving elevated temperatures—above the boiling point of water. It was then discharged from the autoclave, and was then filtered and washed. Because of the use of bauxite in place of lime, the average filtration and washing of the batch required only about 4 hours, as compared to 12-15 hours priorly used for filtration and washing when lime was used in place of bauxite. Larger proportions of bauxite have effected still greater savings of time for filtering and washing. The resultant economy in speed and cost of works operation is manifest.

To the cooled filtrate we then add sufficient slacked lime, e. g., 600 lbs., to precipitate the compounds of silicic, phosphoric, and stannic acids remaining in solution. After these precipitates are filtered off and washed, the desired compound of the metal may be precipitated from solution and washings, as a calcium salt, such as calcium tungstate, as by a further addition of slacked lime or other calcium compounds at a higher temperature, usually between 60 and 80° C.; or, the metal values may be separated from the desilicized solution, as by cooling it after suitable concentration, to room temperature of, say 40° C. in the winter and not over 70° C. in summer. This, of course, gives a separation of crystallized tungstate of soda.

However, because of the presence of dissolved organic compounds or the other highly colored constituents in the solution, the desired end products and the mother liquors are usually off-color, notwithstanding the fact that bauxite has the further advantage that it acts to some degree as a decolorant. Accordingly, the end product often requires further purification and the mother liquors cannot be re-used for a subsequent charge in place of the water and caustic soda used in the first charge.

We have accordingly effected a futher improvement by treating the solution of the alkali salt of the metal acid, either while in the autoclave or at any time before it is separated or precipitated from the solution, with a suitable quantity of an adsorbent such as activated carbon—315 lbs. would be sufficient for purification of liquors from a batch of the composition above given. The liquors need not be heated with the activated carbon, but it is preferably kept in suspension by agitation; and they are then filtered from the activated carbon, which may be revivified by known means and re-used in a succeeding batch.

The thus purified solution of the alkaline salt of the tungsten or other metal acid is thereupon concentrated and crystallized, or the calcium salt is precipitated therefrom, followed, as before described, by concentration of the liquors before re-use, if necessary.

These improvements effect a noteworthy reduction in the time and cost of preparing purified compounds of tungsten and similar metals from their ores or residues. The process described is illustrative and minor modifications may be made therein without departing from the spirit of our invention.

We claim:

1. In the extraction of tungsten and similar metals from ores and residues, the process which comprises digesting the metal bearing material at a temperature above 100° C., together with an excess of an alkaline solution of an alkali metal compound and a quantity of bauxite sufficient to provide a freely filtering gangue and to convert a substantial amount of the compounds of silicic, phosphoric and stannic acids into insoluble aluminum salts of those acids, filtering and washing the gangue, cooling the solution, adding sufficient slacked lime to complete precipitation of silicic acid and other remaining inorganic impurities, decolorizing the solution by treatment with activated carbon, separating a compound of the desired metal from the solution, as by crystallization or precipitation, and, finally, using the alkaline mother liquor in a subsequent digestion of ore or residue.

2. In the extraction of tungsten and similar metals from ores and residues, the process which comprises digesting the metal bearing material at an elevated temperature, together with bauxite, water, and an excess of a caustic alkali, filtering, cooling, disilicizing and decolorizing the solution, separating a compound of the desired metal as by crystallization or precipitation, and using the alkaline mother liquor in a subsequent digestion of ore or residue.

3. In the extraction of tungsten and similar metals from ores and residues, the process which comprises digesting the metal bearing material at an elevated temperautre, together with water, an excess of caustic alkali, and sufficient bauxite to provide a freely filtering gangue, filtering off and cooling the solution, precipitating and removing remaining impurities as insoluble lime salts, decolorizing the solution by treating it with a decolorant, separating a compound of the desired metal from the solution, as by crystallization or precipitation, and using the alkaline mother liquor in a subsequent digestion of ore or residue.

4. In the extraction of tungsten and similar metals from ores and residues, the process which comprises digesting the metal bearing material at an elevated temperature, together with sufficient caustic alkali, water, and bauxite to form a soluble compound of the metal and a freely filtering gangue, decolorizing, filtering off and cooling the solution, removing remaining impurities as insoluble lime salts, and separating a compound of the desired metal from the solution, as by crystallization or precipitation.

5. In the extraction of tungsten and similar metals from ores and residues, the process which comprises digesting the metal bearing material at an elevated temperature, together with water and sufficient bauxite and alkali to form a soluble compound of the metal and a freely filtering gangue, filtering off, cooling and desilicizing the solution, and separating a compound of the desired metal by crystallization and precipitation.

GIDEON BOERICKE.
EDWARD E. BOERICKE.